United States Patent
Huth et al.

(10) Patent No.: US 9,453,427 B2
(45) Date of Patent: Sep. 27, 2016

(54) SYSTEMS AND METHODS FOR PURGING AN AFT JOINT OF A LAST STAGE WHEEL

(71) Applicant: General Electric Company, Schenectady, NY (US)

(72) Inventors: Scott Jacob Huth, Greenville, SC (US); Michael James Fedor, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 526 days.

(21) Appl. No.: 14/067,196

(22) Filed: Oct. 30, 2013

(65) Prior Publication Data
US 2015/0118016 A1    Apr. 30, 2015

(51) Int. Cl.
*F01D 5/08*    (2006.01)
*F01D 17/14*   (2006.01)
*F01D 11/00*   (2006.01)

(52) U.S. Cl.
CPC ............. *F01D 17/14* (2013.01); *F01D 5/082* (2013.01); *F01D 11/001* (2013.01); *Y02T 50/673* (2013.01); *Y02T 50/676* (2013.01)

(58) Field of Classification Search
None
See application file for complete search history.

(56) References Cited

U.S. PATENT DOCUMENTS

| | | | | |
|---|---|---|---|---|
| 3,734,639 A | * | 5/1973 | Short | F01D 5/185 415/114 |
| 4,086,757 A | * | 5/1978 | Karstensen | F01D 5/082 415/115 |
| 5,394,041 A | | 2/1995 | Oberdorfer-Bogel | |
| 5,593,274 A | * | 1/1997 | Carreno | F01D 5/081 285/300 |
| 6,554,570 B2 | * | 4/2003 | Dailey | F01D 5/18 415/115 |
| 7,484,935 B2 | | 2/2009 | Heitland | |
| 2006/0275126 A1 | | 12/2006 | Heitland | |

FOREIGN PATENT DOCUMENTS

| | | |
|---|---|---|
| CA | 1327677 A1 | 3/1994 |
| CN | 2747373 Y | 12/2005 |
| DE | 19932479 A1 | 3/2000 |
| DE | 202006018482 U1 | 2/2007 |
| EP | 1486643 A2 | 12/2004 |
| EP | 1486643 A3 | 2/2007 |
| GB | 0987839 A | 3/1965 |
| GB | 1137630 A | 12/1968 |
| RU | 2180043 C2 | 2/2002 |
| RU | 2443869 C2 | 2/2012 |

* cited by examiner

*Primary Examiner* — Ninh H Nguyen
*Assistant Examiner* — Justin Seabe
(74) *Attorney, Agent, or Firm* — Sutherland Asbill & Brennan LLP

(57) ABSTRACT

Embodiments of the present application include a gas turbine assembly. The gas turbine assembly may include a solid wheel, a turbine aft shaft, and an aft joint connecting the solid wheel to the turbine aft shaft. The turbine assembly also may include a cover plate positioned between the solid wheel and the turbine aft shaft. The cover plate may be configured to direct a flow of compressor extraction fluid inboard through the aft joint and out the turbine aft shaft.

20 Claims, 4 Drawing Sheets

SYSTEMS AND METHODS FOR PURGING AN AFT JOINT OF A LAST STAGE WHEEL

FIELD OF THE DISCLOSURE

Embodiments of the present disclosure relate generally to a gas turbine engine and more particularly to systems and methods for purging an aft joint of a last stage wheel.

BACKGROUND

Gas turbines are widely used in industrial and commercial operations. A typical gas turbine includes a compressor at the front, one or more combustors around the middle, and a turbine at the rear. The compressor imparts kinetic energy to the working fluid (e.g., air) to produce a compressed working fluid at a highly energized state. The compressed working fluid exits the compressor and flows to the combustors where it mixes with fuel and ignites to generate combustion gases having a high temperature and pressure. The combustion gases flow to the turbine where they expand to produce work. For example, expansion of the combustion gases in the turbine may rotate a shaft connected to a generator to produce electricity.

The compressor and the turbine typically share a common rotor which extends from near the front of the compressor to near the rear of the turbine. The rotor typically is configured to direct a portion of the compressed air through one or more cooling circuits to cool various components of the gas turbine. The cooling circuits, however, may not be capable of adequately cooling and/or purging an aft joint of a last stage wheel without creating a large temperature gradient in the last stage wheel.

SUMMARY

Some or all of the above needs and/or problems may be addressed by certain embodiments of the present application. According to one embodiment, there is disclosed a gas turbine assembly. The gas turbine assembly may include a solid wheel, a turbine aft shaft, and an aft joint connecting the solid wheel to the turbine aft shaft. The turbine assembly also may include a cover plate positioned between the solid wheel and the turbine aft shaft. The cover plate may be configured to direct a flow of compressor extraction fluid inboard through the aft joint and out the turbine aft shaft.

According to another embodiment, there is disclosed a gas turbine assembly. The gas turbine assembly may include a last stage solid wheel, a turbine aft shaft positioned adjacent to the last stage solid wheel, an aft joint connecting the last stage solid wheel to the turbine aft shaft. The turbine assembly also may include a cover plate positioned between the last stage solid wheel and the turbine aft shaft. The cover plate may be configured to direct a flow of compressor extraction fluid inboard through the aft joint and out the turbine aft shaft.

Further, according to another embodiment, there is disclosed a method for purging an aft joint between a last stage wheel and a turbine aft shaft of a turbine assembly. The method may include flowing a flow of compressor extraction air within the turbine assembly. The method also may include positioning a cover plate between the last stage solid wheel and the turbine aft shaft. The cover plate may form an enclosure about the aft joint. Moreover, the method may include directing, by the cover plate, the flow of compressor extraction fluid inboard through the aft joint and out the turbine aft shaft.

Other embodiments, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale.

DETAILED DESCRIPTION

Illustrative embodiments will now be described more fully hereinafter with reference to the accompanying drawings, in which some, but not all embodiments are shown. The present systems and methods may be embodied in many different forms and should not be construed as limited to the embodiments set forth herein. Like numbers refer to like elements throughout.

Figure 1:
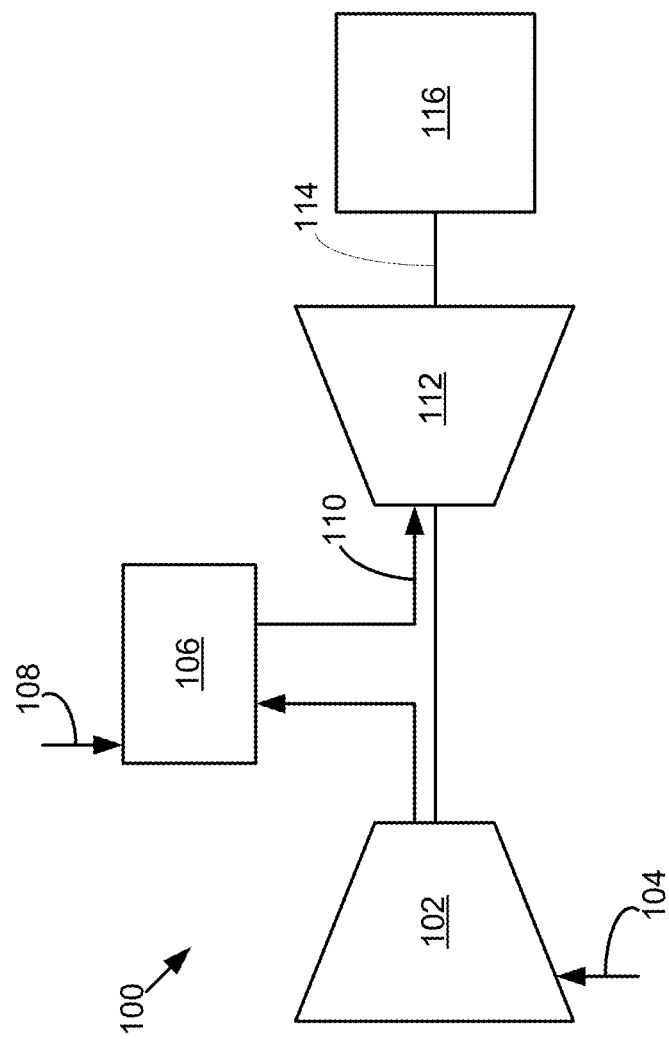
FIG. 1 schematically depicts an example gas turbine engine, according to an embodiment.

FIG. 1 depicts an example schematic view of a gas turbine engine 100 as may be used herein. The gas turbine engine 100 may include a compressor 102. The compressor 102 may compress an incoming flow of air 104. The compressor 102 may deliver the compressed flow of air 104 to a combustor 106. The combustor 106 may mix the compressed flow of air 104 with a pressurized flow of fuel 108 and ignite the mixture to create a flow of combustion gases 110. Although only a single combustor 106 is shown, the gas turbine engine 100 may include any number of combustors 106. The flow of combustion gases 110 may be delivered to a turbine 112. The flow of combustion gases 110 may drive the turbine 112 so as to produce mechanical work. The mechanical work produced in the turbine 112 may drive the compressor 102 via a shaft 114 and an external load 116, such as an electrical generator or the like.

The gas turbine engine 100 may use natural gas, various types of syngas, and/or other types of fuels. The gas turbine engine 100 may be any one of a number of different gas turbine engines offered by General Electric Company of Schenectady, New York, including, but not limited to, those such as a 7 or a 9 series heavy duty gas turbine engine or the like. The gas turbine engine 100 may have different configurations and may use other types of components. The gas turbine engine 100 may be an aeroderivative gas turbine engine, an industrial gas turbine engine, or a reciprocating engine. Other types of gas turbine engines also may be used herein. Multiple gas turbine engines, other types of turbines, and other types of power generation equipment also may be used herein together.

Figure 2:
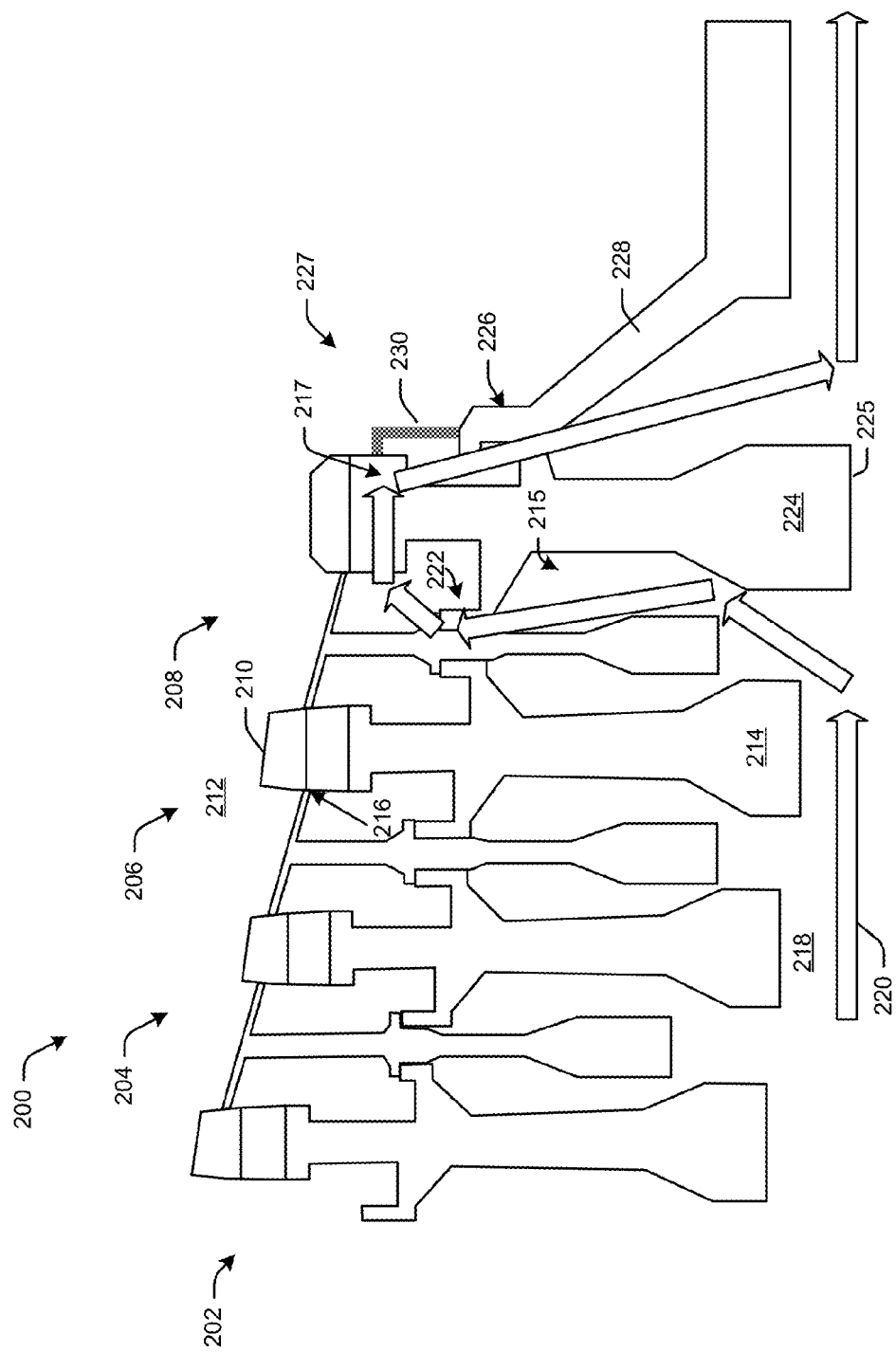
FIG. 2 schematically depicts an example turbine assembly, according to an embodiment.

FIG. 2 schematically depicts a cross-section view of an exemplary turbine assembly 200 as may be used herein. As shown, the turbine assembly 200 may generally include a number of stages, such as a stage one 202, a stage two 204, a stage three 206, and a stage four 208, although more or less stages may be included. Each stage may include a rotating bucket 210 extending into a hot gas path 212. Each of the rotating buckets 210 may be connected to a wheel 214 by way of a dovetail assembly 216 or the like. In some instances, one or more of the wheels 214 may include an axial bore 218 therethrough.

A portion of the compressed flow of air from the compressor may bypass the combustors and be supplied directly to the turbine assembly 200 for cooling and/or purging the various components of the turbine assembly 200. For example, the diverted flow of compressor air may include an inner diameter compressor extraction air 220. The compressor extraction air 220 may flow through the bore 218 and into the wheel space cavities 215 formed between each of the wheels 214. Some of the compressor extraction air 220 may flow between the wheels 214 via a channel 217 formed at the interface of the dovetail assembly 216 and/or through the joints 222 connecting the wheels 214. The compressor extraction air 220 may be used to pressurize the wheel space cavities 215 within the turbine assembly 200 to produce a differential pressure between the wheel space cavities 215 and the hot gas path 212 in the turbine assembly 200. In addition, the compressor extraction air 220 may be used to cool and/or purge the various components of the turbine assembly 200.

In some instances, one or more of the wheels 214 may be solid wheels. That is, the bore 218 may be omitted in the solid wheels. For example, the last stage wheel 224 may be a solid wheel 225 having no bore therethrough. A common problem with solid last stage wheels is the inability to purge an aft joint 226 between the solid last stage wheel 224 and a turbine aft shaft 228. In certain embodiments, a cover plate 230 may be positioned between the solid last stage wheel 224 and the turbine aft shaft 228. The cover plate 230 may create a circuit 227 that supplies air from the last stage wheel 224, through the aft joint 226, and out via the turbine aft shaft 228. The cover plate 230 may enable the aft joint 226 to be purged with substantially the same temperature air that is on the forward side of the solid last wheel 224. Additionally, because both sides of the solid last wheel 224 (forward and aft) may receive substantially the same temperature air, the thermal stresses in the solid last wheel 224 may be reduced. In this manner, the cover plate 230 may prevent the compressor extraction air 220 from blowing outboard after passing through the solid last wheel 224; instead, the cover plate 230 may direct the compressor extraction air 220 inward (or inboard) through the aft joint 226 and out through the turbine aft shaft 228.

Figure 3:
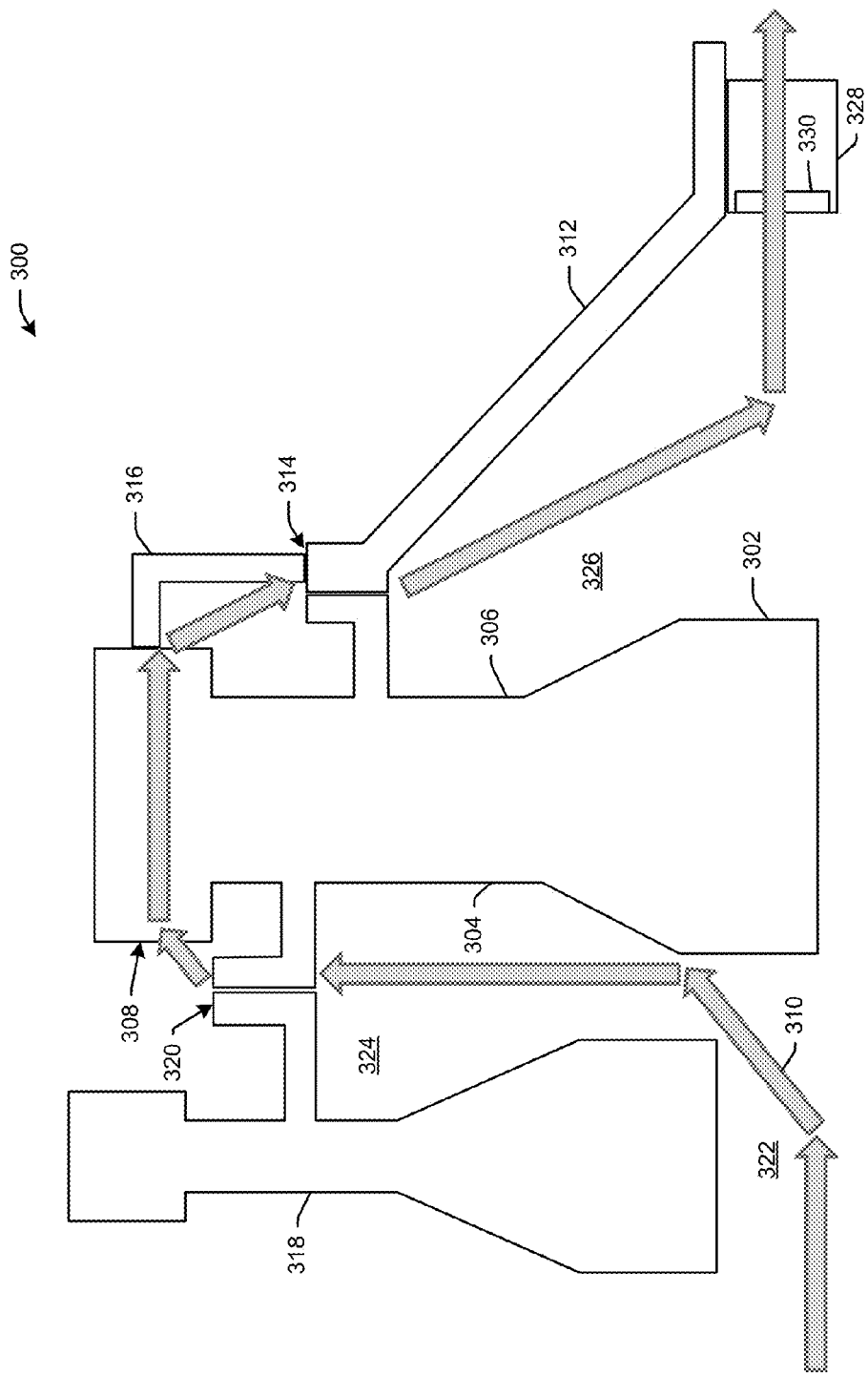
FIG. 3 schematically depicts an example turbine assembly, according to an embodiment.

FIG. 3 schematically depicts a cross-section view of an exemplary turbine assembly 300 as may be used herein. The turbine assembly 300 may include a last stage solid wheel 302. For example, the last stage solid wheel may be a stage four solid wheel, although other stages may be included. The last stage solid wheel 302 may include a forward side 304 and an aft side 306. The last stage solid wheel 302 also may include a dovetail channel 308 configured to receive a corresponding dovetail associated with a bucket. The dovetail channel 308 may be configured to allow a flow of compressor extraction air 310 to pass therethrough between the interfaces.

The turbine assembly 300 also may include a turbine aft shaft 312. The aft side 306 of the last stage solid wheel 302 may be connected to the turbine aft shaft 312 by way of an aft joint 314. In some instances, the aft joint 314 may be a bolt joint or the like.

In certain embodiments, the turbine assembly 300 may include a cover plate 316 positioned between the last stage solid wheel 302 and the turbine aft shaft 312. For example, the cover plate 316 may extend from the aft side 306 of the last stage solid wheel 302 to the turbine aft shaft 312. The cover plate 316 may extend circumferentially about the aft joint 314. That is, the cover plate 316 may be positioned about the aft joint 314 so as to enclose the aft joint 314 between the aft side 306 of the last stage solid wheel 302 and the turbine aft shaft 312. The cover plate 316 may configured to direct the flow of compressor extraction air 310 inboard through the aft joint 314 and out the turbine aft shaft 312.

In some instances, the turbine assembly 300 may include a bored wheel 318 positioned adjacent to the forward side 304 of the last stage solid wheel 302. The bored wheel 318 may be connected to the forward side 304 of the last stage wheel by way of a forward joint 320. In some instances, the forward joint 320 may be a bolt joint or the like. As its name implies, the bored wheel 318 may include an axial bore 322 therethrough. The axial bore 322 may be configured to allow the flow of compressor extraction air 310 to pass therethrough.

A forward wheel space 324 may be formed between the bored wheel 318 and the last stage solid wheel 302, and an aft wheel space 326 may be formed between the last stage solid wheel 302, the cover plate 316, and the turbine aft shaft 312. In this manner, the flow of compressor extraction air 310 may pass through the bore 322 and into the forward wheel space 324. Next, the flow of compressor extraction air 310 may pass through the forward joint 320 and into the dovetail channel 308. The flow of compressor extraction air 310 may exit the dovetail channel 308 into the aft wheel space 326. The cover plate 316 may direct the flow of compressor extraction air 310 exiting the dovetail channel 308 inboard through the aft joint 314 and out the turbine aft shaft 312. Accordingly, the flow of compressor extraction air 310 may purge the aft joint 314 with substantially the same temperature air that is on the forward side 304 of the solid last wheel 302, thereby reducing the thermal gradients about the solid last wheel 302 that may exist by using separate cooling circuits on the forward 304 and aft 306 sides of the solid last wheel 302.

In certain embodiments, the turbine assembly 300 may include flow control device 328, such as an adjustable orifice 330, configured to meter the flow of compressor extraction air 310 through the aft joint 314. For example, the flow control device 328 may include a static pipe or the like associated with the turbine aft shaft 312 that is configured to allow the flow of compressor extraction air 310 to exit to ambient air outside of the turbine assembly 300. An adjustable orifice 330 at the static pipe interface may be adjusted to allow for proper flow metering. Moreover, in some instances, the temperatures and pressure can be measured such that the flow of compressor extraction air 310 may be optimized on an engine-to-engine basis.

Figure 4:
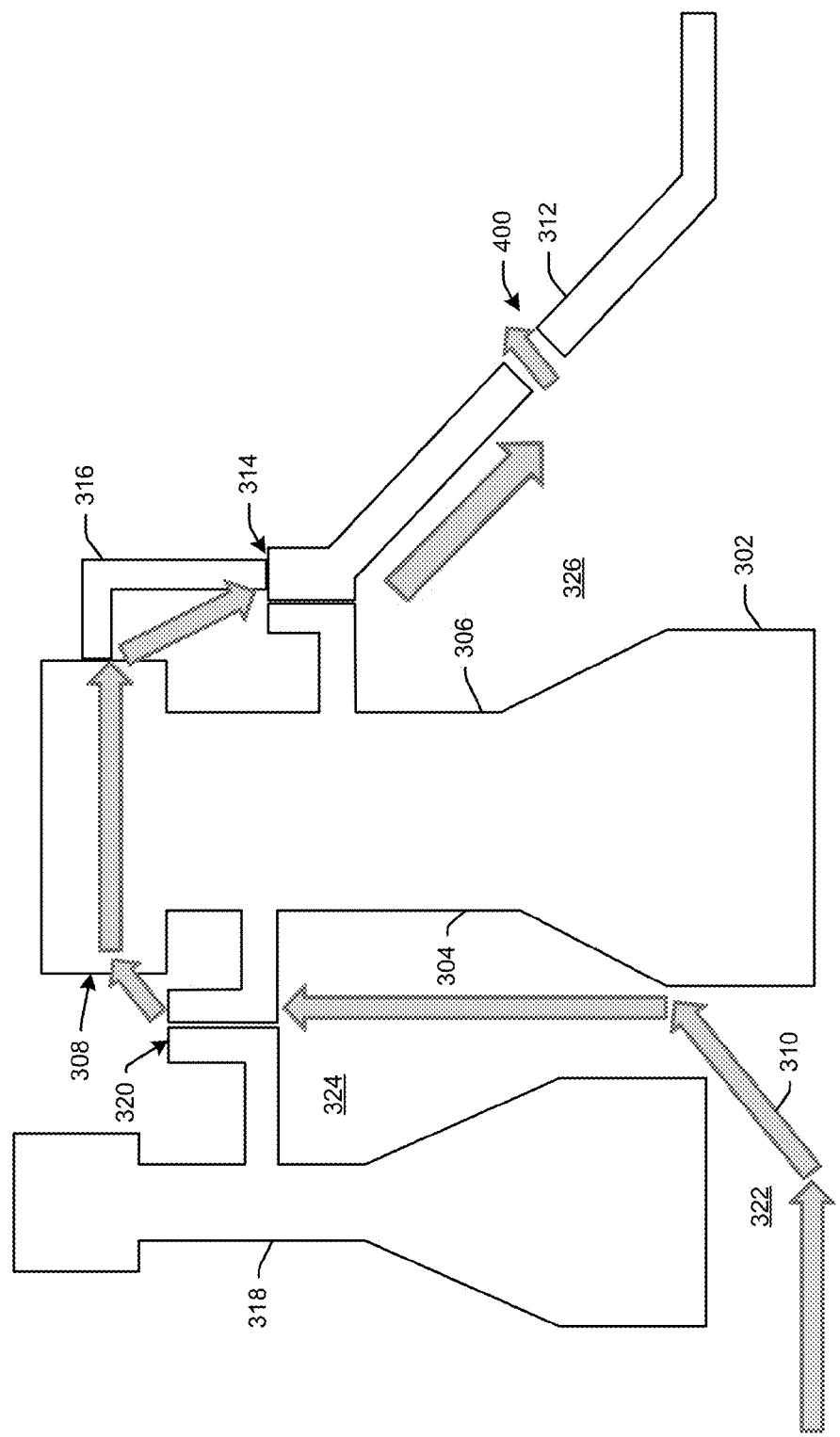
FIG. 4 schematically depicts an example turbine assembly, according to an embodiment.

As depicted in FIG. 4, the turbine assembly 300 may include a hole 400 (or aperture) in the turbine aft shaft 312. In this manner, the flow of compressor extraction air 310 may pass through the hole 400 rather than through the bore of the turbine aft shaft 312. In some instances, the hole 400 may include a metering device like the flow control device 328 of FIG. 3.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A gas turbine assembly comprising a flow of compressor extraction fluid, the gas turbine assembly comprising:
   a solid wheel having no bore therethrough;

a turbine aft shaft;

an aft joint connecting the solid wheel to the turbine aft shaft; and a cover plate positioned between the solid wheel and the turbine aft shaft, wherein the cover plate is configured to direct the flow of compressor extraction fluid radially inward through the aft joint and out via the turbine aft shaft.

2. The assembly of claim 1, wherein the solid wheel comprises a last stage solid wheel.

3. The assembly of claim 1, further comprising a bored wheel positioned adjacent to a forward side of the solid wheel.

4. The assembly of claim 3, further comprising a forward joint connecting the bored wheel and the solid wheel.

5. The assembly of claim 3, further comprising a forward wheel space formed between the bored wheel and the solid wheel.

6. The assembly of claim 1, further comprising an aft wheel space formed between the solid wheel, the turbine aft shaft, and the cover plate.

7. The assembly of claim 1, further comprising a dovetail channel extending axially though the solid wheel.

8. The assembly of claim 1, further comprising a flow control device positioned downstream of the aft joint, wherein the flow control device is configured to meter the flow of compressor extraction fluid through the aft joint.

9. The assembly of claim 8, wherein the flow control device comprises an adjustable orifice.

10. A gas turbine assembly comprising a flow of compressor extraction fluid, the gas turbine assembly comprising:

a last stage solid wheel having no bore therethrough;

a turbine aft shaft positioned adjacent to the last stage solid wheel;

an aft joint connecting the last stage solid wheel to the turbine aft shaft; and a cover plate positioned between the last stage solid wheel and the turbine aft shaft, wherein the cover plate is configured to direct the flow of compressor extraction fluid radially inward through the aft joint and out via the turbine aft shaft.

11. The assembly of claim 10, further comprising a bored wheel positioned adjacent to a forward side of the last stage solid wheel.

12. The assembly of claim 11, further comprising a forward joint connecting the bored wheel and the last stage solid wheel.

13. The assembly of claim 11, further comprising a forward wheel space formed between the bored wheel and the last stage solid wheel.

14. The assembly of claim 10, further comprising an aft wheel space formed between the last stage solid wheel, the turbine aft shaft, and the cover plate.

15. The assembly of claim 10, further comprising a dovetail channel extending axially though the last stage solid wheel.

16. The assembly of claim 10, further comprising a flow control device positioned downstream of the aft joint, wherein the flow control device is configured to meter the flow of compressor extraction fluid through the aft joint.

17. The assembly of claim 16, wherein the flow control device comprises an adjustable orifice.

18. A method for purging an aft joint between a last stage solid wheel having no bore therethrough and a turbine aft shaft of a turbine assembly, comprising:

flowing a flow of compressor extraction air within the turbine assembly;

positioning a cover plate between the last stage solid wheel and the turbine aft shaft, wherein the cover plate forms an enclosure about the aft joint; and directing, by the cover plate, the flow of compressor extraction fluid radially inward through the aft joint and out the turbine aft shaft.

19. The method of claim 18, further comprising metering the flow of compressor extraction fluid through the aft joint with a flow control device positioned downstream of the aft joint.

20. The method of claim 18, further purging the aft joint with the flow of compressor extraction fluid.

* * * * *